United States Patent
Relyea et al.

(10) Patent No.: US 8,139,080 B2
(45) Date of Patent: Mar. 20, 2012

(54) USER INTERFACE COLOR SCHEME CUSTOMIZATION SYSTEMS AND METHODS

(75) Inventors: Donald H. Relyea, Dallas, TX (US); Heath Stallings, Colleyville, TX (US); Brian F. Roberts, Dallas, TX (US); Daniel Dunnam, Brooklyn, NY (US); Andrew Allman, Dallas, TX (US); Sok Young Hwang, Dallas, TX (US); Kristopher T. Frazier, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 699 days.

(21) Appl. No.: 12/263,338

(22) Filed: Oct. 31, 2008

(65) Prior Publication Data

US 2010/0110101 A1    May 6, 2010

(51) Int. Cl.
  *G09G 5/00* (2006.01)
  *G09G 5/02* (2006.01)
  *H04N 5/202* (2006.01)
  *H04N 5/46* (2006.01)
  *G03F 3/08* (2006.01)
  *G06K 9/00* (2006.01)
  *G06K 9/40* (2006.01)

(52) U.S. Cl. ........ 345/594; 345/581; 345/589; 345/591; 345/619; 348/254; 348/557; 358/518; 358/520; 382/165; 382/167; 382/254; 382/274

(58) Field of Classification Search .................. 348/581, 348/589, 591, 600–604, 617, 619, 254–256, 348/557, 607, 649, 687, 518–520, 162–165, 348/167, 274, 276, 293, 299
See application file for complete search history.

(56) References Cited

U.S. PATENT DOCUMENTS

| | | | |
|---|---|---|---|
| 5,416,890 A * | 5/1995 | Beretta | 345/590 |
| 2006/0227149 A1* | 10/2006 | Cain | 345/594 |
| 2007/0200867 A1* | 8/2007 | Reynolds et al. | 345/589 |
| 2007/0257937 A1* | 11/2007 | Rye et al. | 345/617 |
| 2009/0259567 A1* | 10/2009 | Watts | 705/27 |
| 2010/0020095 A1* | 1/2010 | Reynolds et al. | 345/594 |

OTHER PUBLICATIONS

Wikipedia, "HSL and HSV," http://en.wikipedia.org/wiki/HSL_color_space, as accessed Oct. 31, 2008, 7 pages.
"The Color Space Conversions Applet," http://www.cs.rit.edu/~ncs/color/a_spaces.html, as access Oct. 31, 2008, 1 page.

* cited by examiner

*Primary Examiner* — Wesner Sajous

(57) ABSTRACT

In certain exemplary embodiments, data representative of a color scheme including a plurality of colors is maintained, a parameter for each of the colors is shifted by a same offset to generate another color scheme, and the other color scheme is associated with a graphical user interface. In certain embodiments, the shifting preserves at least one of a hue relationship and a contrast relationship between the colors in the color scheme. In certain embodiments, at least one user interface tool configured to facilitate a user selection of one of the colors included in the color scheme and a change to be applied to the color, and the same offset is determined based on the user selection.

25 Claims, 16 Drawing Sheets

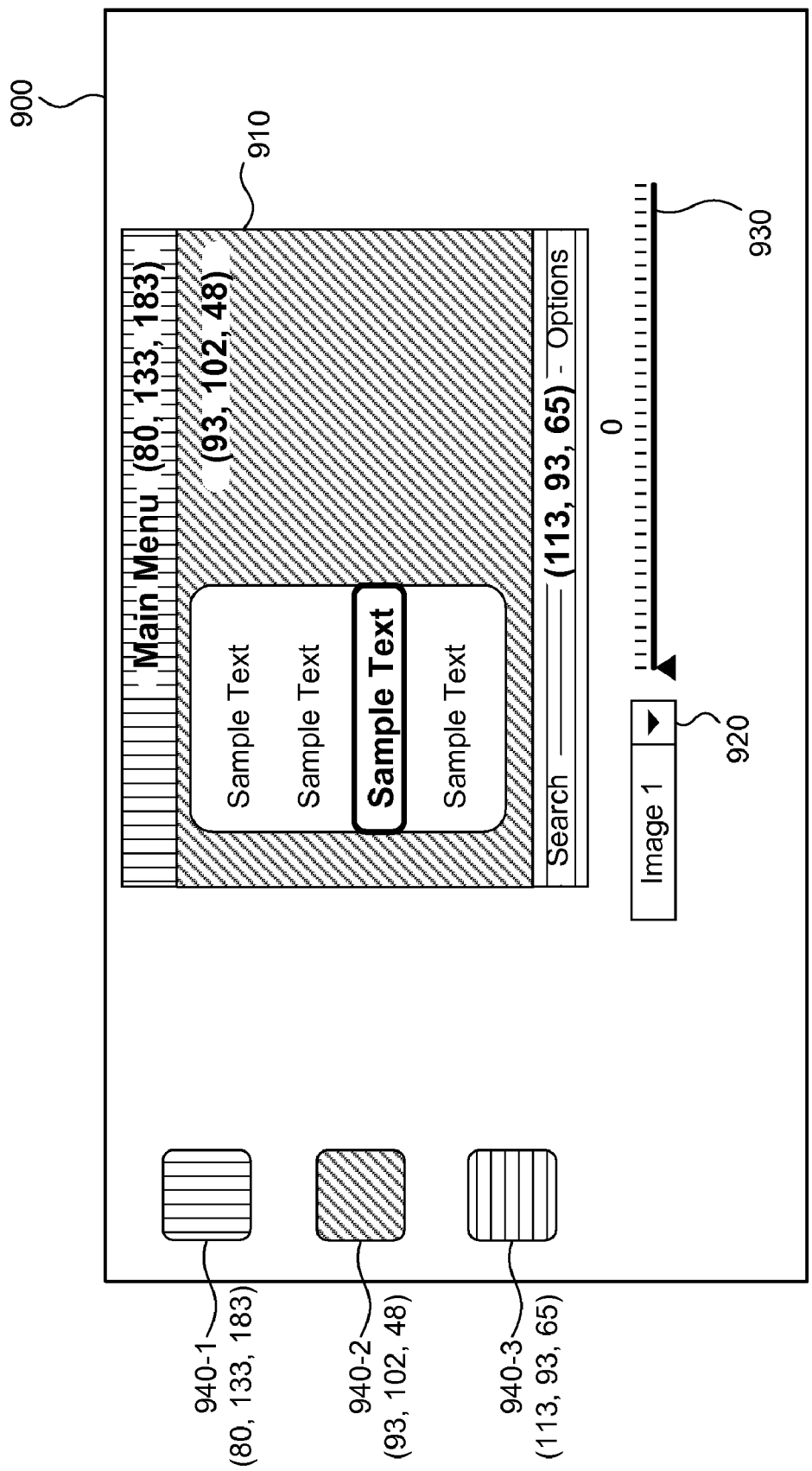

USER INTERFACE COLOR SCHEME CUSTOMIZATION SYSTEMS AND METHODS

BACKGROUND INFORMATION

An electronic device typically provides a user interface through which a user may interact with the electronic device. A graphical user interface "GUI" is one example of a user interface that may be displayed on a display screen of an electronic device and utilized by a user to interact with the device.

It is not uncommon for users of electronic devices to want to personalize their electronic devices such as by choosing display settings for GUIs. However, there are limited options available to typical end users for changing GUIs. For example, one conventional option is limited to allowing a user to choose a GUI theme from a group of predefined GUI themes.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 9A-9D illustrate exemplary GUIs including at least one exemplary user interface tool.

DETAILED DESCRIPTION OF PREFERRED EMBODIMENTS

Exemplary user interface color scheme customization apparatuses, systems, and methods are described herein. In certain exemplary embodiments, data representative of a color scheme including a plurality of colors is maintained, a parameter for each of the colors is shifted by a same offset to generate another color scheme, and the other color scheme is associated with a graphical user interface. In certain embodiments, the shifting preserves at least one of a hue relationship and a contrast relationship between the colors in the color scheme. In certain embodiments, at least one user interface tool configured to facilitate a user selection of one of the colors included in the color scheme and a change to be applied to the color in provided, and the same offset is determined based on the user selection.

The exemplary user interface color scheme customization apparatuses, systems, and methods described herein may facilitate customization of a GUI while also preserving certain relationships and design principles of the GUI. In particular, customization of a color scheme for use with a GUI may be facilitated. Certain embodiments described herein may facilitate a user generating a custom color scheme from an initial color scheme. The custom color scheme may include certain custom parameters as well as certain parameters that have been preserved from the initial color scheme.

As used herein, a "color scheme" may refer to any data representative of an arrangement of multiple colors (e.g., a palette of colors) and corresponding parameters that may be associated with a GUI and/or image. For example, a color scheme may specify parameters for colors associated with various locations (e.g., areas, points, and/or pixels) within and/or assets of a GUI.

Exemplary embodiments of user interface color scheme customization apparatuses, systems, and methods will now be described in more detail with reference to the accompanying drawings.

Figure 1:
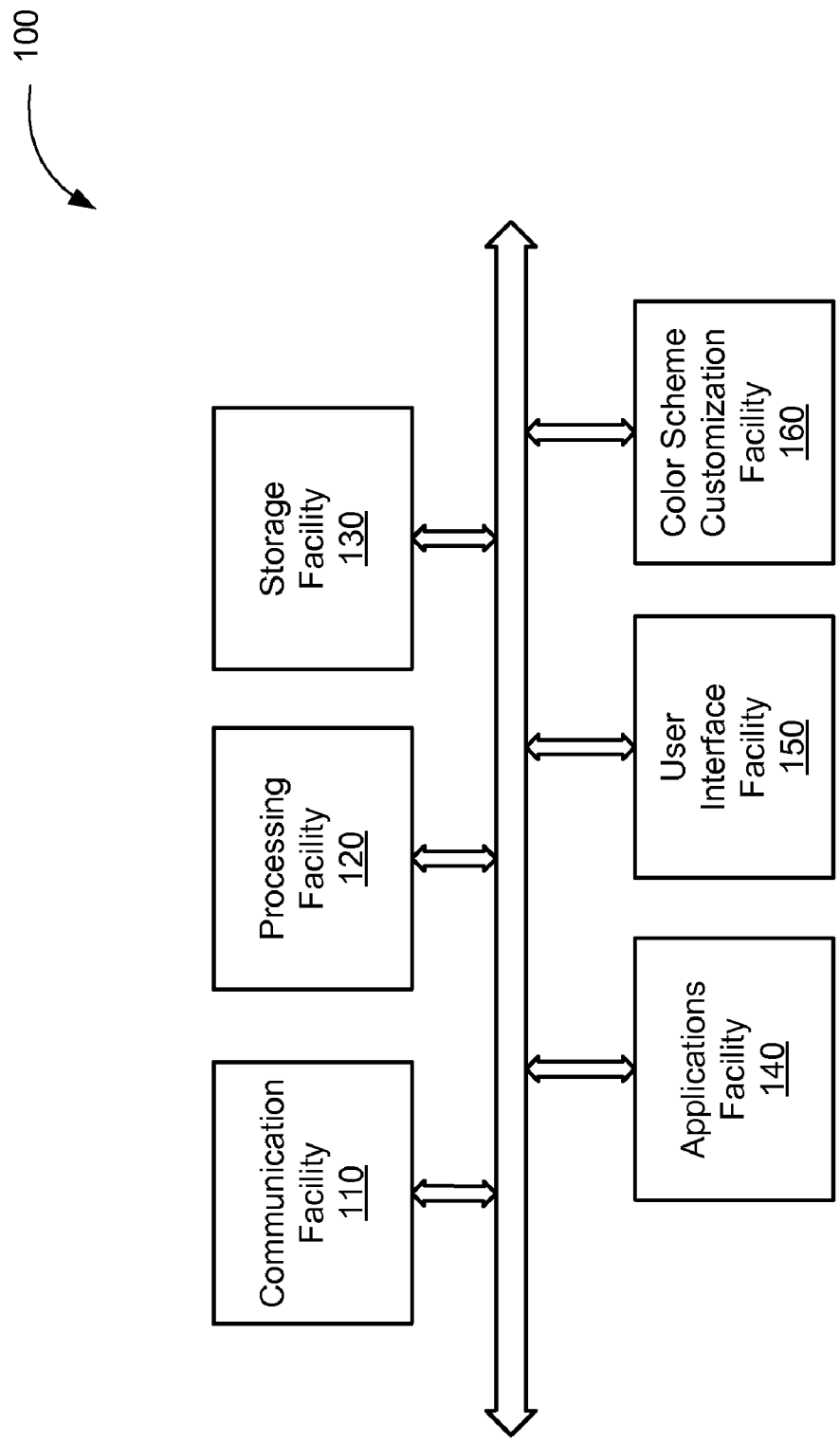
FIG. 1 illustrates a user interface color scheme customization system.

FIG. 1 illustrates an exemplary user interface color scheme customization system 100 (or simply "system 100"). As shown in FIG. 1, system 100 may include a communication facility 110, processing facility 120, storage facility 130, applications facility 140, user interface facility 150, and color scheme customization facility 160 communicatively connected to one another. The facilities 110-160 may be communicatively connected using any suitable technologies and may communicate using any communication platforms and/or technologies suitable for transporting communications, data, and/or signals between the facilities 110-160.

In some examples, system 100 may include any computing hardware and/or instructions (e.g., software programs), or combinations of computing instructions and hardware, configured to perform one or more of the processes described herein. In particular, it should be understood that system 100 or components of system 100 may be implemented on one physical computing device or may be implemented on more than one physical computing device. Accordingly, system 100 may include any one of a number of computing devices, and may employ any of a number of computer operating systems.

One or more of the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory.

Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computing device can read.

Accordingly, each of the facilities 110-160 may be implemented as hardware, computing instructions (e.g., software) tangibly embodied on a computer-readable medium, or a combination of hardware and tangibly embodied computing instructions configured to perform one or more of the processes described herein. In certain embodiments, for example, color scheme customization facility 160 and/or one or more other facilities may be implemented as one or more software applications embodied on a computer-readable medium such as storage facility 130 or other memory and configured to direct processing facility 120 to execute one or more of the processes described herein.

The components of system 100 shown in FIG. 1 are illustrative only. Other embodiments may add, omit, or reconfigure one or more components. In certain embodiments, for example, communication facility 110 may be omitted.

Figure 2:
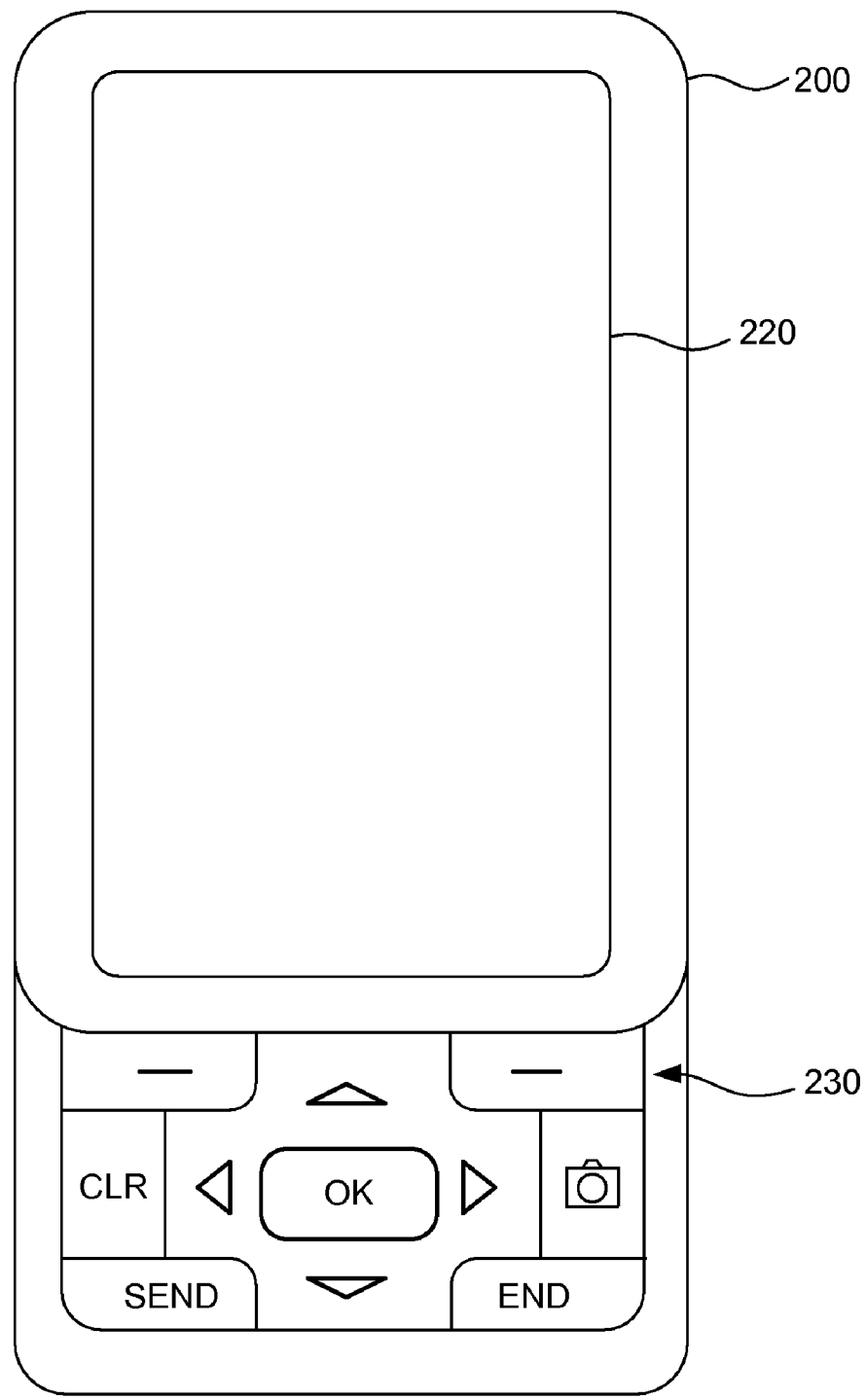
FIG. 2 illustrates an exemplary device having the system of FIG. 1 implemented therein.

System 100 may be implemented as may suit a particular application. FIG. 2 illustrates an exemplary device 200 having system 100 implemented thereon. Device 200 may include one or more of the facilities 110-160 shown in FIG. 1 and may be configured to perform one or more of the processes and/or operations described herein. Device 200 may include, but is not limited to, a mobile device (e.g., a mobile phone device), media device, handheld device, computer, gaming device, phone device (e.g., Verizon Hub device), communications device, navigation device, entertainment device, vehicular device, personal-digital assistant, digital camera, display device, and/or any other device having one or more components of system 100 implemented therein.

Device 200 may include a display screen 220 configured to display one or more graphical user interfaces ("GUIs") for viewing by a user of device 200. Display screen 220 may be included in user interface facility 150. Examples of GUIs and various GUI views that may be displayed on display screen 220 are described in detail further below. Device 200 may also include input mechanisms such as one or more of the input buttons 230 shown in FIG. 2.

Figure 3:
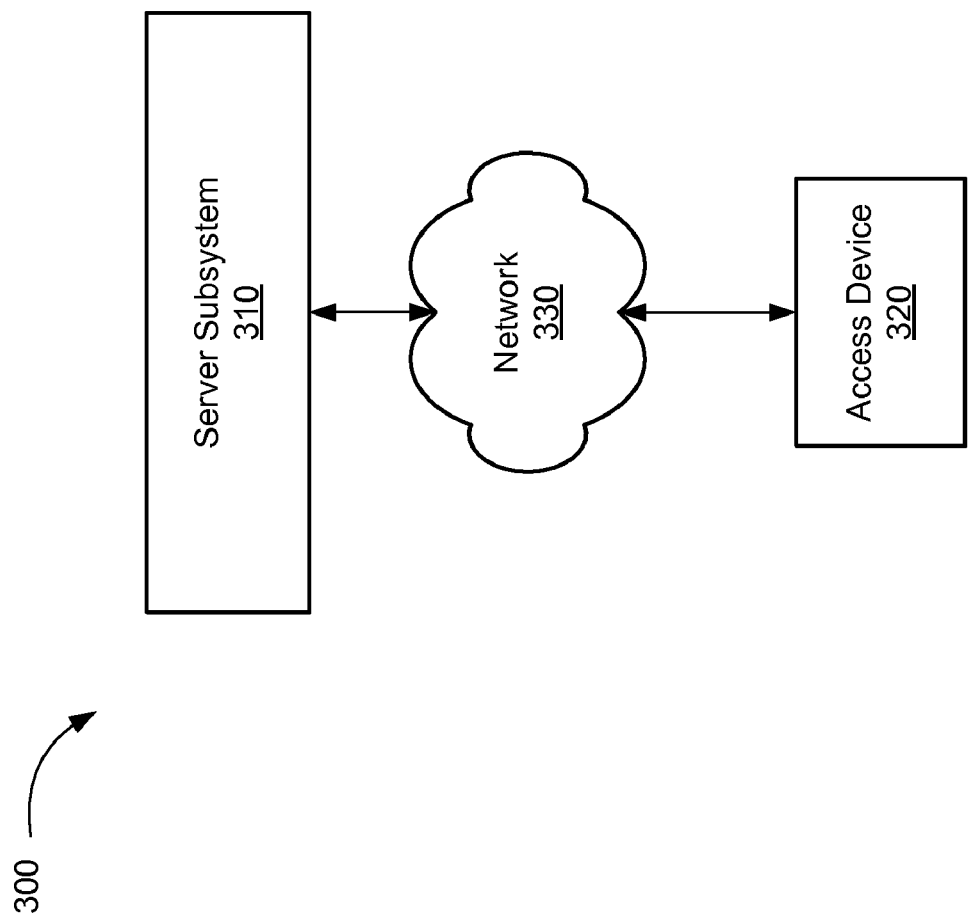
FIG. 3 illustrates another exemplary implementation of the system of FIG. 1.

FIG. 3 illustrates another exemplary implementation 300 of system 100. As shown, implementation 300 may include a server subsystem 310 selectively and communicatively connected to an access device 320 by way of a network 330.

The access device 320 and the server subsystem 310 may communicate over network 330 using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 330 may include one or more networks, including, but not limited to, wireless networks, mobile telephone networks (e.g., cellular telephone networks), closed media networks, open media networks, subscriber television networks, closed communication networks, open communication networks, satellite networks, navigation networks, optical fiber networks, broadband networks, narrowband networks, voice communications networks (e.g., VoIP networks), Public Switched Telephone Networks, the Internet, wide area networks, local area networks, public networks, private networks, and any other networks capable of carrying data and/or communications signals between access device 320 and server subsystem 310. Communications between server subsystem 310 and access device 320 may be transported using any one of above-listed networks, or any combination or sub-combination of the above-listed networks.

One or more of the facilities 110-160 shown in FIG. 1 may be implemented in server subsystem 310 or in a combination of server subsystem 310 and access device 320. Accordingly, access device 320 may be used to access server subsystem 310 and one or more of the color scheme customization processes described herein. As described herein, system 100 may be configured to facilitate customization of a color scheme for use with a GUI. Each of the facilities 110-160 shown in FIG. 1 will now be described in more detail.

Communication facility 110 may be configured to send and/or receive communications to/from one or more external devices (e.g., a server or access device). Communication facility 110 may include and/or employ any device, logic, communication media, communication protocols, and/or other technologies suitable for transmitting and receiving communications signals and data, including any of the communication technologies, devices, media, and protocols mentioned above.

Processing facility 120 may include one or more processors and may be configured to execute and/or direct execution of one or more processes or operations described herein. Processing facility 120 may direct execution of operations in accordance with computer-executable instructions such as may be stored in storage facility 130 or another computer-readable medium. As an example, processing facility 120 may be configured to process data, including demodulating, decoding, and parsing acquired data, and encoding and modulating data for transmission by communication facility 110.

Storage facility 130 may include one or more data storage media, devices, or configurations and may employ any type, form, and combination of storage media. For example, the storage facility 130 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Electronic data, e.g., color scheme data, may be temporarily and/or permanently stored in the storage facility 130.

Applications facility 140 may include any combination of hardware, software, and/or firmware configured to execute one or more applications. In certain embodiments, applications facility 140 includes at least one software application tangibly embodied on a computer readable medium and configured to direct processing facility 120 to perform one or more application operations. Examples of such applications may include, but are not limited to, media player applications, media content processing applications, menu applications, media program guide applications, image viewer applications (e.g., 3-D image viewer applications), and communications applications (e.g., phone, messaging, and/or web browser applications).

User interface facility 150 may be configured to present output to a user. For example, user interface facility 150 may include one or more components configured to generate and display a GUI for viewing by a user. Any suitable display components and technologies may be employed by user interface facility 150, including a display screen 220 and one or more display screen drivers. Exemplary GUIs that may be displayed on a display screen 220 of user interface facility 150 are illustrated in the accompanying drawings and described further below.

User interface facility 150 may be configured to interact with applications facility 140. For example, user interface facility 150 may send and receive data and/or signals to/from applications facility 140, including receiving GUI data for use in generating one or more GUIs (e.g., menu, media player, media program guide, and image viewer application GUIs) for display.

Figure 4:
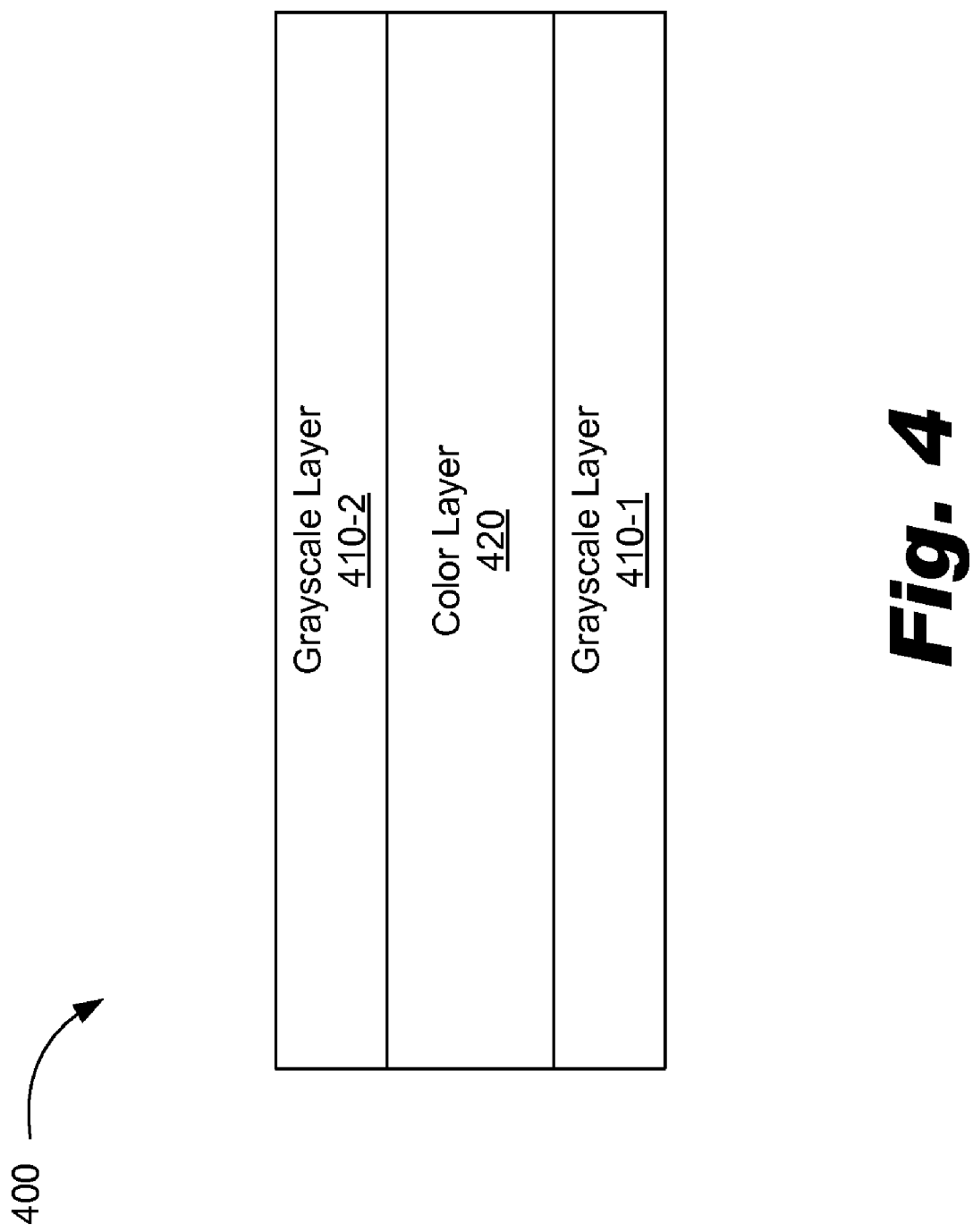
FIG. 4 illustrates layers of an exemplary graphical user interface ("GUI") architecture.

User interface facility 150 may be configured to generate and display a GUI having an architecture that is conducive to customization of a GUI color scheme. FIG. 4 illustrates an exemplary GUI architecture 400 having a plurality of layers, including grayscale layers 410-1 and 410-2 (collectively "grayscale layers 410") and a color layer 420. As shown in FIG. 4, grayscale layer 410-1 may be positioned under color layer 420 and grayscale layer 410-2 may be positioned above color layer 420 such that color layer 420 is sandwiched between the grayscale layers 410-1 and 420-2. With this configuration, the grayscale layers 410 may be configured to affect how a color scheme represented in the color layer 420 appears to a user viewing the GUI. In particular, grayscale layer 410-2 positioned above color layer 420 may especially affect the appearance of color layer 420 from a perspective of a user.

Each of the grayscale layers 410 may include one or more grayscale assets (e.g., grayscale vector assets such as circles, rectangles, or other shapes) having one or more grayscale parameters. The grayscale assets and corresponding parameters may be defined by a designer of a GUI and may be designed to produce particular visual effects from a user perspective. As an example, grayscale assets may include transparency parameters, which may be set to various transparency values. Such grayscale assets may be referred to as "grayscale transparency assets." The transparencies of grayscale assets may affect the appearance of color layer 420 to various degrees, such as a degree to which a portion of the color layer 420 is visible to a user, for example. Examples of other grayscale asset parameters may include, but are not limited to, grayscale saturation, lightness, reflectance, brightness, shading, tone, opacity, and contrast parameters. One or more of these parameters, or any combination or sub-combination of these parameters, may be configured in one or more grayscale layers 410 in a way that may affect the appearance of the color layer 420 in a GUI.

Figure 5:
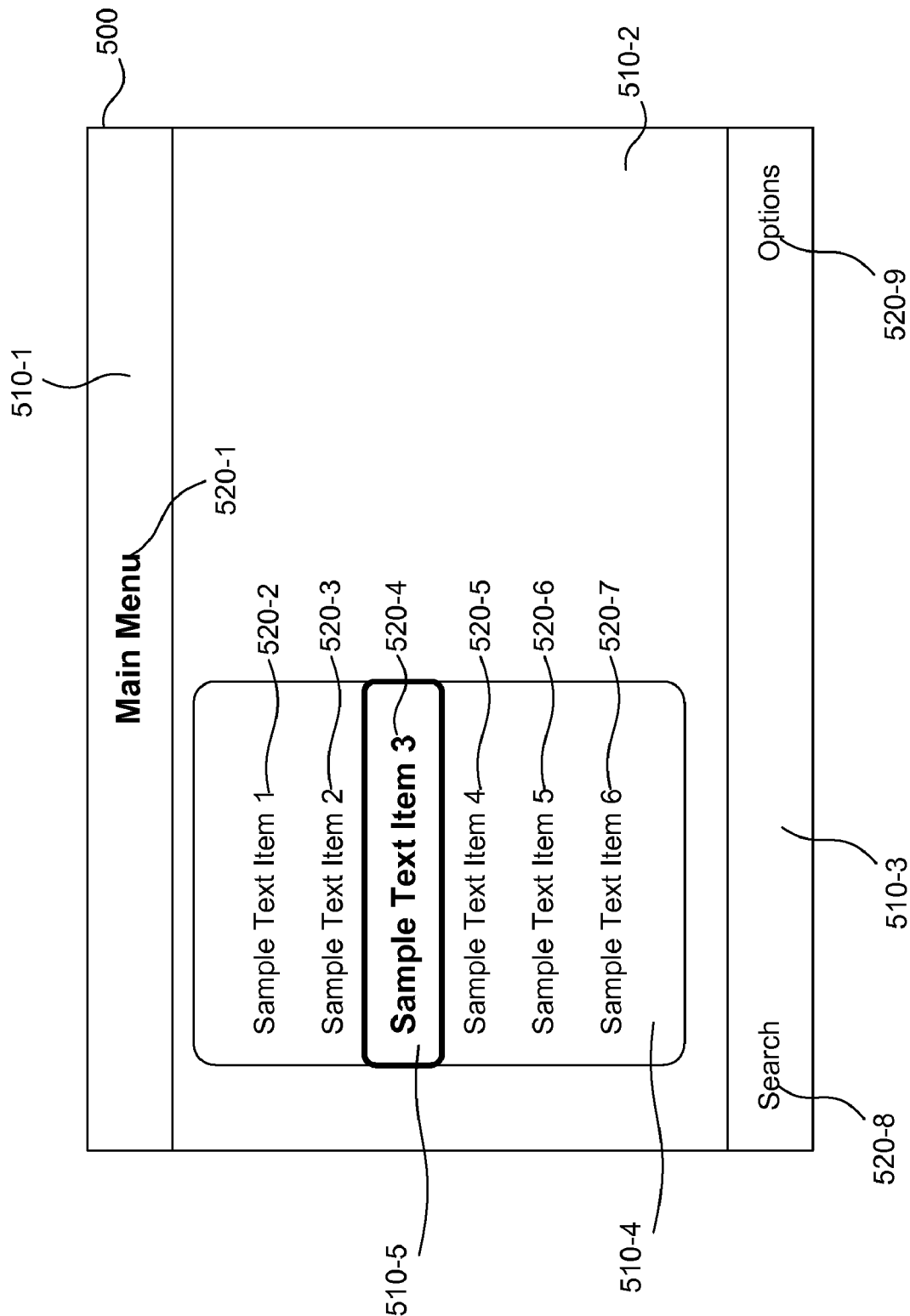
FIG. 5 illustrates a grayscale GUI that may be displayed on a display screen.

FIG. 5 illustrates an exemplary GUI 500 as may be displayed on display screen 220. GUI 500 may include one or more grayscale layers 410 having one or more grayscale assets. In the illustrated example, GUI 500 includes multiple generally rectangular-shaped grayscale layer assets (e.g., grayscale shape assets 510-1 through 510-5, collectively referred to as "grayscale shape assets 510") arranged at various positions and occupying various areas in GUI 500. GUI 500 may also include grayscale textual assets (e.g., grayscale textual asset 520-1 through 520-9, collectively referred to as "grayscale textual assets 520").

Each of the grayscale assets may be associated with one or more grayscale parameters, including any of those listed above, having certain parameter settings. Accordingly, the grayscale assets in GUI 500 may collectively have various parameters that produce contrasts between the assets. For example, one or more of the grayscale assets in GUI 500 may have distinct transparency, saturation, and/or lightness values.

GUI architecture 400 may allow a GUI designer to define certain GUI parameters separately and independently of one another. In particular, grayscale parameters corresponding to grayscale layers 410 may be defined independently of color parameters corresponding to color layer 420. For example, one or more grayscale layers 410 may be defined and used by user interface facility 150 to generate the GUI 500 shown in FIG. 5. One or more color layers, such as color layer 420, may be defined and/or added to introduce a color scheme into GUI 500. For instance, data representative of a color scheme may be inserted into or otherwise associated with a color layer 420 of GUI 500 such that a display of GUI 500 will include the color scheme.

A color scheme may be associated with a GUI in any suitable way, including inserting data representative of the color scheme, or a pointer to stored data representative of the color scheme, in color layer 420. Accordingly, when user interface facility 150 generates and provides a GUI for display, color scheme data may be accessed and used to generate the GUI for display. In certain embodiments, a color scheme may be associated with color layer 420 as described above and may include various colors associated with various grayscale assets of one or more grayscale layers 410 of a GUI.

Figure 6:
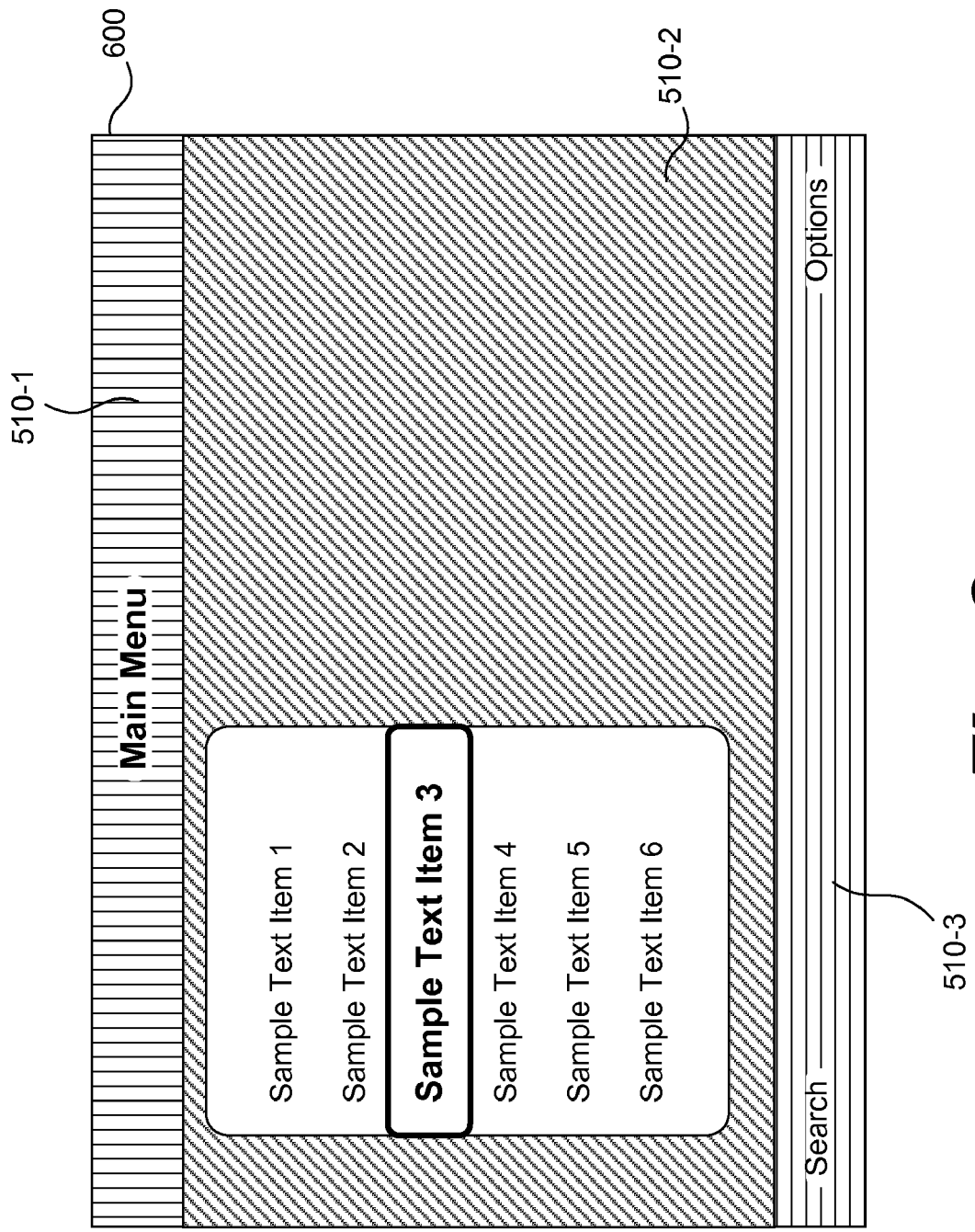
FIG. 6 illustrates the GUI of FIG. 5 with an exemplary color scheme included therein.

FIG. 6 illustrates an exemplary GUI 600 that may be generated and displayed by user interface facility 150. GUI 600 comprises GUI 500 of FIG. 5 with an exemplary color scheme added to a color layer 420 of GUI 500. The color scheme includes a plurality of colors, which may be associated with one or more of the grayscale assets of GUI 600. To illustrate, FIG. 6 shows several different patterns within certain grayscale assets. In particular, a pattern of vertical lines representing a first color of the color scheme is included within grayscale shape asset 510-1, a pattern of diagonal lines representing a second color of the color scheme is included within grayscale shape asset 510-2, and a pattern of horizontal lines representing a third color of the color scheme is included within grayscale shape asset 510-3. The different patterns represent different colors included in the color scheme in GUI 600. The illustrated representations of colors and the associations of the colors with grayscale assets are illustrative only. The color scheme may include additional colors, and colors of the color scheme may have other associations with grayscale assets in GUI 600. For example, several colors may be associated with a single grayscale asset in certain implementations.

A color scheme may be defined in accordance with any suitable color model, including color models typically used with GUIs. Examples of such color models may include, but are not limited to, Red, Green, and Blue ("RGB"), standard Red, Green, and Blue ("sRGB"), Cyan, Magenta, Yellow, and Black ("CMYK"), and cylindrically shaped color space models such as Hue, Saturation, and Value ("HSV"), Hue, Saturation, and Lightness ("HSL"), Hue, Saturation, and Intensity ("HSI"), and Hue, Saturation, and Brightness ("HSB") color space models.

A professional or otherwise skilled GUI designer typically designs and defines a GUI, including a color scheme included in a GUI, in accordance with principles designed to produce a GUI that is usable, legible, intuitive, and/or aesthetically pleasing. To this end, a GUI designer may define a color scheme to include an aesthetically pleasing arrangement and combination of colors designed to promote a pleasant user experience.

Certain users of electronic devices may want to adapt, modify, or otherwise customize a GUI, such as by changing the color scheme associated with the GUI. Unfortunately, a typical end user may lack skills, knowledge, and/or tools to customize a GUI without adversely affecting the design principles and/or qualities of the GUI. Consequently, a designer of a GUI and/or a manufacturer of a software application associated with a GUI may be reluctant to give an end user expansive capability to customize the GUI at least because a custom GUI that violates original design principles may compromise the usability, intuitiveness, or other qualities of a GUI and/or software application associated with the GUI.

System 100 may be configured to facilitate customization of a GUI while also preserving certain relationships and design principles of the GUI. The above-described GUI architecture having a color layer 420 separate from one or more grayscale layers 410 may contribute to a capability to modify a color scheme in a color layer 420 of a GUI while also preserving grayscale parameters defined in one or more grayscale layers 410 of the GUI.

Color scheme customization facility 160 may be configured to facilitate customization of a color scheme for use in a GUI. In particular, color scheme customization facility 160 may be configured to modify certain parameters of a color scheme to generate another color scheme while preserving other parameters and design principles of the initial color scheme. As an example, a color scheme may be associated with a GUI (e.g., GUI 600) and may include a plurality of colors and corresponding parameters as described above. Color scheme customization facility 160 may be configured to shift a parameter for each of the colors in the color scheme by a same offset (e.g., a substantially identical offset) to generate another color scheme, which may be a new, custom color scheme. The shifting of the parameter for each of the colors may be performed in a manner configured to maintain certain relationships and other parameters in the initial color scheme. Accordingly, a user may customize certain parameters of a color scheme while other parameters of the color scheme are preserved.

An exemplary shifting of a color parameter will now be described. As mentioned above, a color scheme may be represented in accordance with any suitable color model, including any of those listed above. In certain embodiments, color scheme customization facility 160 may be configured to use an HSV color space model to shift a color parameter for each of the colors in a color scheme. A database of HSV colors, color points, and/or corresponding parameters may be used to represent and for shifting a color scheme in HSV color space. If an initial color scheme is represented in accordance with another color model, color scheme customization facility 160 may convert the color scheme to an HSV color space model. For example, a color scheme may be converted from an RGB color model to an HSV color model. This may be accomplished using any suitable color model conversion technologies and/or algorithms. After a custom color scheme is generated as described below, color scheme customization facility 160 may convert the custom color scheme from an HSV color space model to another color model as may suit a particular application (e.g., to an RGB color model). Any other suitable color model, including another cylindrical color space model, may be used to shift color scheme parameters in other embodiments.

Figure 7:
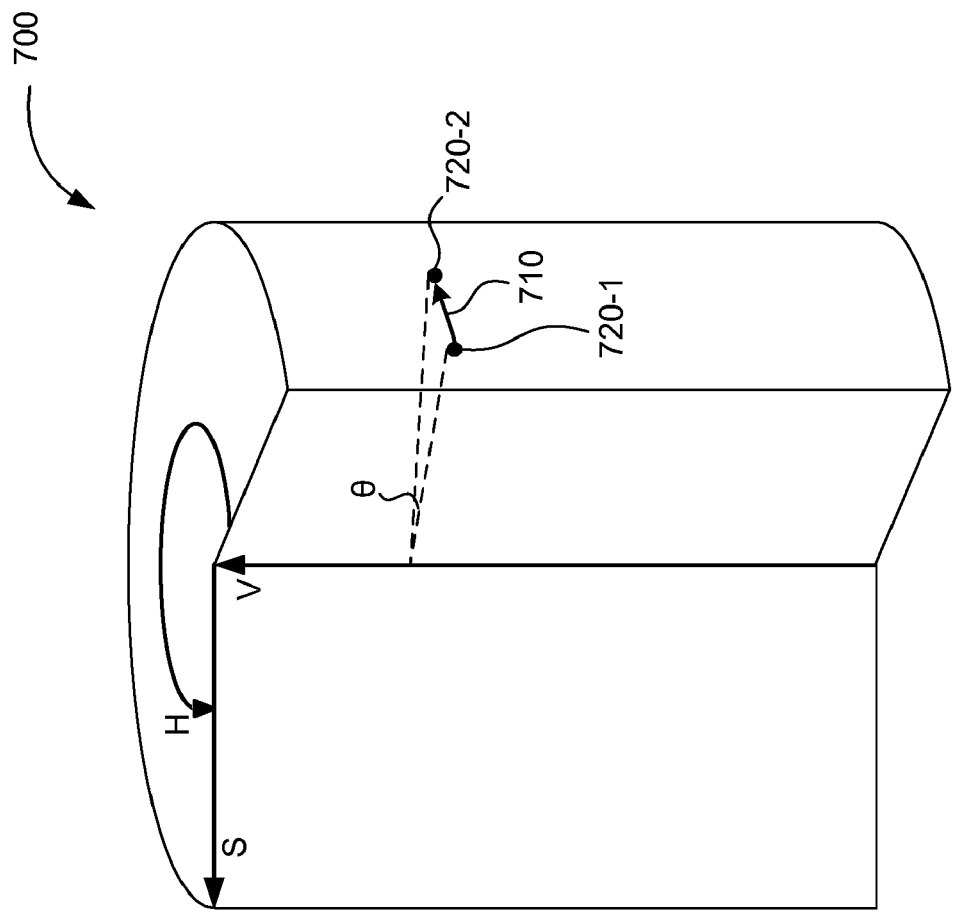
FIG. 7 illustrates a cut-away perspective view of an exemplary color space model.

To help facilitate an understanding of an exemplary shifting of a parameter in a color scheme, FIG. 7 illustrates a cut-away perspective view of an exemplary HSV color space model 700. The HSV color space model 700 is cylindrical in shape and is configured to represent three color parameters—a hue parameter, a saturation parameter, and a value parameter. In the HSV color space model 700, the hue parameter ("H") is represented as an angle about the central axis of the cylinder, the saturation parameter ("S") is represented as a distance away from the central axis, and the value parameter ("V") is represented as a position or distance along the central axis. Accordingly, a color data point included in a color scheme may be represented by an HSV color space model triplet ("HSV triplet") including numerical values for hue, saturation, and value parameters. The HSV triplet corresponds with a particular position in the HSV color space model 700. Hence, a color scheme may be represented by a plurality of color points located at various positions within the HSV color space model 700.

In certain embodiments, color scheme customization facility 160 may be configured to shift a hue parameter for each color or color point in the color scheme while preserving the saturation and value parameters for each color or color point in the color scheme. In certain implementations, color scheme customization facility 160 may be configured to shift the hue parameter for each of the colors in a color scheme by the same offset. For example, each color point in a color scheme may be shifted by a substantially identical angular offset about the central axis in the HSV color space model 700. This uniform color shift may generate another color scheme having a plurality of other colors.

FIG. 7 illustrates an exemplary angular shift in a hue parameter of a color point. In FIG. 7, arrow 710 represents an angular shift ("θ") of the color point from a first position 720-1 to a second position 720-2 in HSV color space model 700. The shift in the hue parameter of color point may also be applied to other color points in a color scheme to shift the color points by the same angular offset ("θ").

The shift in hue parameters in an initial color scheme to generate a new color scheme may preserve certain relationships and/or other parameters included in the initial color scheme. Thus, the new color scheme may include some of the same parameter values and relationships that exist in the initial color scheme. This may allow for certain design parameters and principles included in the initial color scheme to be protected and preserved in a new custom color scheme. Thus, an end user may customize a color scheme of a GUI without risking potentially "breaking" certain design principles of the color scheme and/or GUI.

Examples of relationships and parameters included in a color scheme and that may be preserved by a shift in hue parameters of the color scheme will now be described. Hue parameters for the color points in a color scheme may have certain relationships between one another. Such hue parameter relationships may be measured by angular distances between the hue parameters of color points in the color scheme. A shift of each of the hue parameters by the same angular offset preserves the angular distance relationships between the color points in the color scheme. Accordingly, color scheme customization facility 160 may shift a hue parameter for each color or color point in a color scheme to generate a new color scheme having a new set of colors or color points. The hue parameter relationships between the colors or color points in the initial color scheme will remain unchanged in the new color scheme. Preservation of hue parameter relationships in a new color scheme may help maintain one or more desired effects intended by a designer of the initial color scheme, such as using colors having relationships that may tend to produce an aesthetically pleasing GUI view when the colors are combined in the GUI.

Saturation and value parameters for colors in the initial color scheme may also be preserved in the new color scheme. This may be accomplished by shifting only the hue parameters in the HSV color space model 700. Preservation of saturation and value parameters may help maintain certain color scheme features such as contrast relationships between colors and/or assets included in a GUI.

Spatial relationships between color points of a color scheme mapped to HSV color space model 700 may also be preserved by a uniform shift in hue parameters of the color points. As mentioned, each color point may be represented as an HSV triplet identifying a spatial position in HSV color space model 700. Hence, the color points may have spatial relationships between one another. The spatial relationships may be preserved when hue parameters of the color points are shifted by the same offset and the saturation and value parameters remain unchanged by the shift. Preservation of spatial relationships between color points in a new color scheme may help maintain one or more desired effects intended by a designer of the initial color scheme.

As yet another example, grayscale parameters defined in one or more grayscale layers 410 may also be preserved. For example, transparency parameter values for grayscale assets may be maintained. As mentioned above, color layer 420 is separate from grayscale layers 410, and parameters defined in the grayscale layers 410 may remain unchanged by a shift or other change to one or more parameters in color layer 420. This may help preserve certain design principles and/or features included in a GUI. Moreover, a designer of the GUI may design one or more grayscale layers 410 in a way that may skew parameters of color layer 420 toward desired design principles in the GUI.

An initial color scheme may be associated with a GUI. For example, the initial color scheme may be associated with a color layer 420 of the GUI. After parameters of colors in the initial color scheme have been shifted to generate another color scheme as described above, color scheme customization facility 160 may associate the new color scheme with the GUI, or with any other GUI. In effect, associating the new color scheme with the GUI may substitute the new color scheme for the initial color scheme in color layer 420 of the GUI such that when the GUI is subsequently generated and displayed, the GUI includes the new color scheme.

Figure 8A:
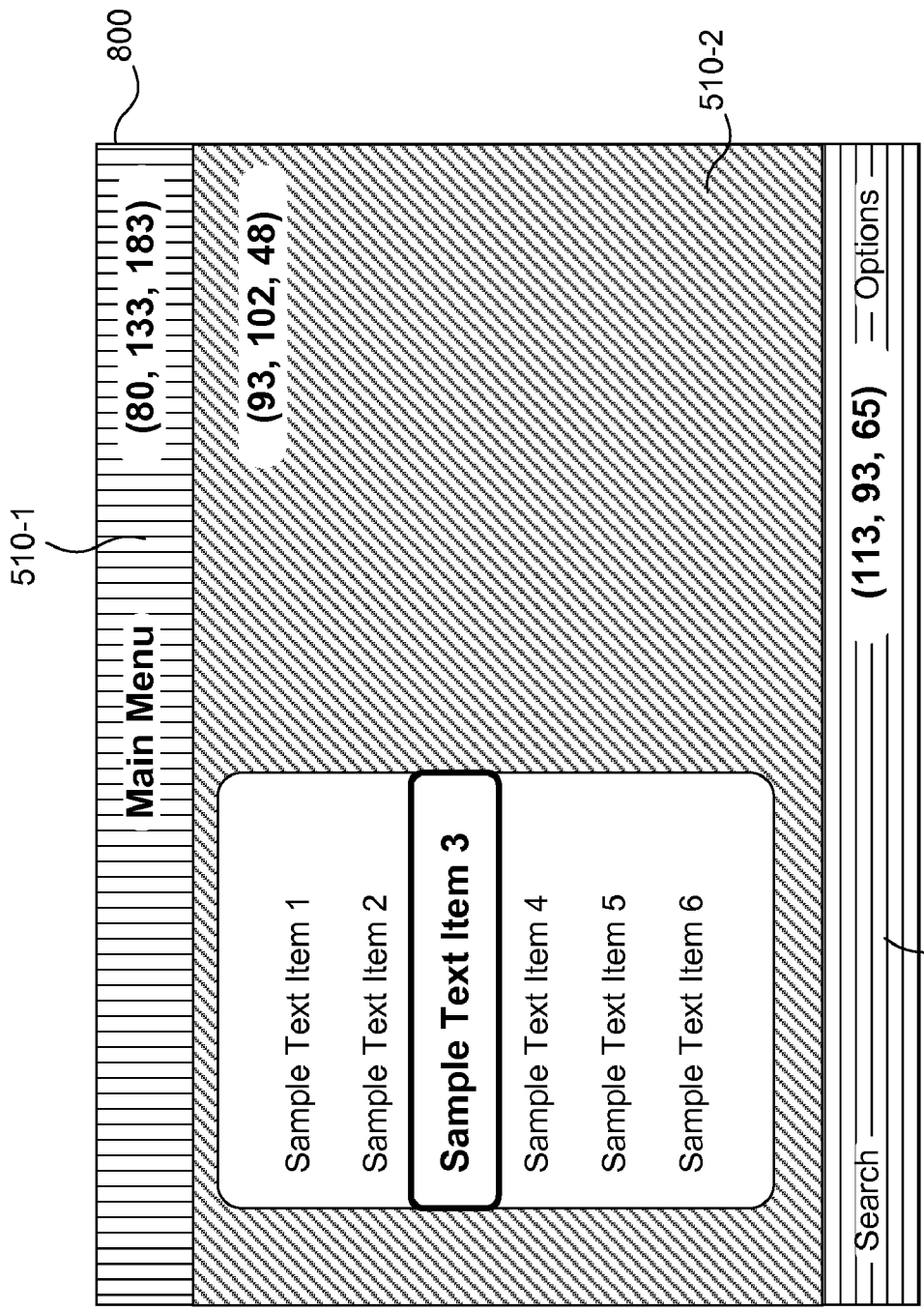
FIGS. 8A-8B illustrate exemplary GUIs with different color schemes included therein.
Figure 8B:
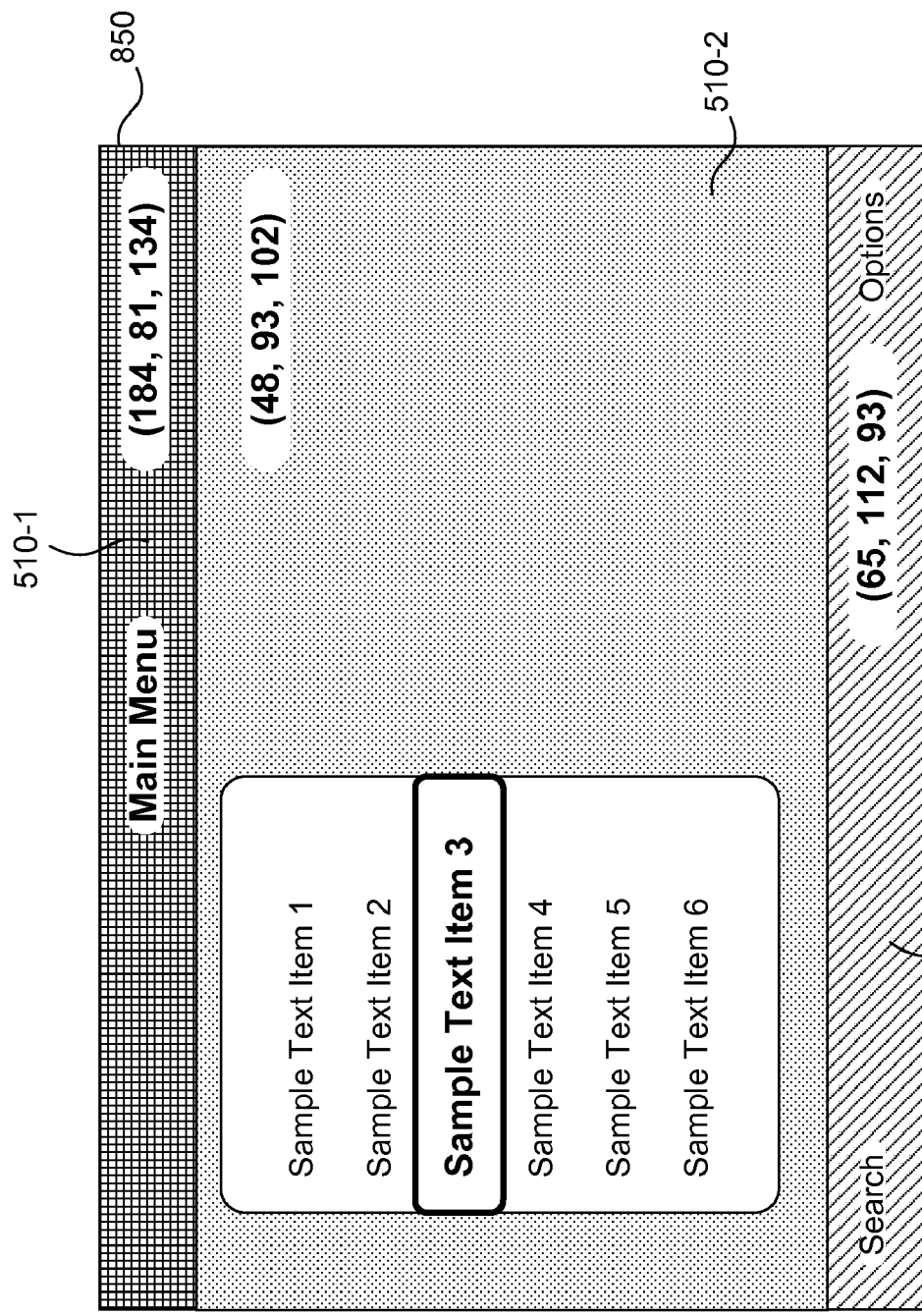

FIGS. 8A-8B illustrate exemplary GUIs 800 and 850 having different color schemes respectively included therein. GUI 800 shown in FIG. 8A includes an initial color scheme, and GUI 850 shown in FIG. 8B includes another color scheme, which color scheme customization facility 160 generated by shifting a hue parameter of each of the colors in the initial color scheme by the same angular offset in the HSV color space model 700 as described above. Color scheme customization facility 160 then associated the new color scheme with GUI 800, which in effect substituted the new color scheme for the initial color scheme in GUI 800 to produce GUI 850 shown in FIG. 8B.

As shown in FIG. 8A, the initial color scheme may include at least three colors associated with certain different areas of GUI 800. The colors are represented by different line patterns, i.e., vertical, diagonal, and horizontal line patterns, shown within certain areas of GUI 800. In FIG. 8A, each of the colors in the initial color scheme is represented by numerical values placed within the corresponding pattern in GUI 800. The vertical-lined pattern represents a color having RGB triplet (80, 133, 183), the diagonal-lined pattern represents a color having RGB triplet (93, 102, 48), and the horizontal-lined pattern represents a color having RGB triplet (113, 93, 65). The colors represented by the RGB triplets are illustrative only and not limiting in any sense. Other colors may be used in other examples.

As described above, color scheme customization facility 160 may convert the colors represented by the RGB triplets to the HSV color space model 700 and shift a hue parameter of each of the colors in the HSV color space model 700 by the same offset to generate another color scheme. Color scheme customization facility 160 may then convert the colors of the new color scheme to RGB triplets and associate the new color scheme with GUI 800. Consequently, when user interface facility 150 generates and displays GUI 800, GUI 850 including the new color scheme will actually be generated and displayed.

Exemplary colors in the new color scheme are represented in FIG. 8B. As shown, each of the colors in the new color scheme is represented by new numerical values respectively placed within new checkered, speckled, and diagonal patterns shown in GUI 850. The checkered pattern represents a color having RGB triplet (184, 81, 134), the speckled pattern represents a color having RGB triplet (48, 93, 102), and the diagonal-lined pattern represents a color having RGB triplet (65, 112, 93). The values for the RGB triplets in FIGS. 8A-8B are representative of an angular offset of one hundred twenty degrees (120°) applied in the HSV color space model 700 to generate a new color scheme from the initial color scheme. This is illustrative only. Other angular offsets may be applied in other examples.

Color scheme customization facility 160 may be configured to provide at least one user interface tool configured to facilitate user customization of a color scheme for association with a GUI. The user interface tool(s) may include a customization GUI and/or one or more tools included in the customization GUI. FIGS. 9A-9D illustrate an exemplary customization GUI 900 (or simply "GUI 900") as may be displayed on a display screen 220. GUI 900 may include one or more user interface tools configured to facilitate user customization of a color scheme for association with a GUI.

Figure 9A:
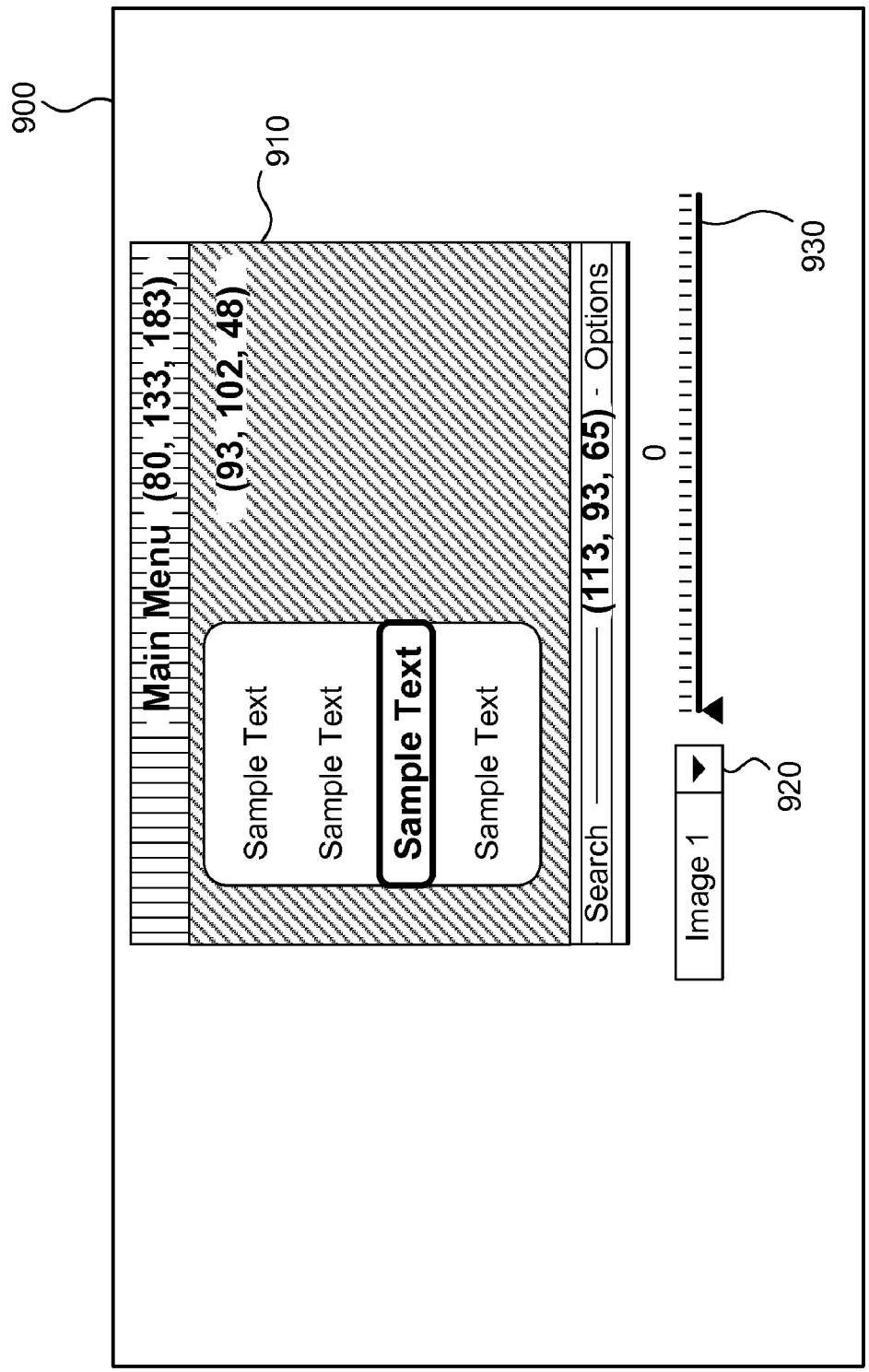

Examples of user interface tools will now be described. As shown in FIG. 9A, GUI 900 may include an image area 910, drop-down menu 920, and graphical slider 930 tools. Image area 910 may display a visual representation of a GUI or other image. Drop-down menu 920 may be configured to facilitate user selection of an image for display in image area 910. For example, a drop-down menu 920 may provide a list of images accessible to a user. When an image is selected from drop-down menu 920, the selected image may be displayed in image area 910. Alternative or in addition to drop-down menu 920, one or more other tools may be provided to facilitate a user selection of an image (e.g., a GUI view) including a color scheme that may be used to generate a custom color scheme as described above. Graphical slider tool 930 may be configured to facilitate a user selection of a change to be made to colors in a color scheme. Each of these tools, as well as additional tools that may be provided GUI 900, will now be described with reference to a specific example of a color scheme customization.

In the example shown in FIG. 9A, image area 910 includes a representation of the GUI 800 shown in FIG. 8A. A user may select one of the colors in an initial color scheme included in GUI 800 by selecting one of the colors displayed in image area 910. This user selection may be made in any suitable way. For example, the user may move a cursor over and select a position in image area 910. Color scheme customization facility 160 may be configured to recognize the user selection and identify a color corresponding with the selected position in image area 910.

Figure 9B:
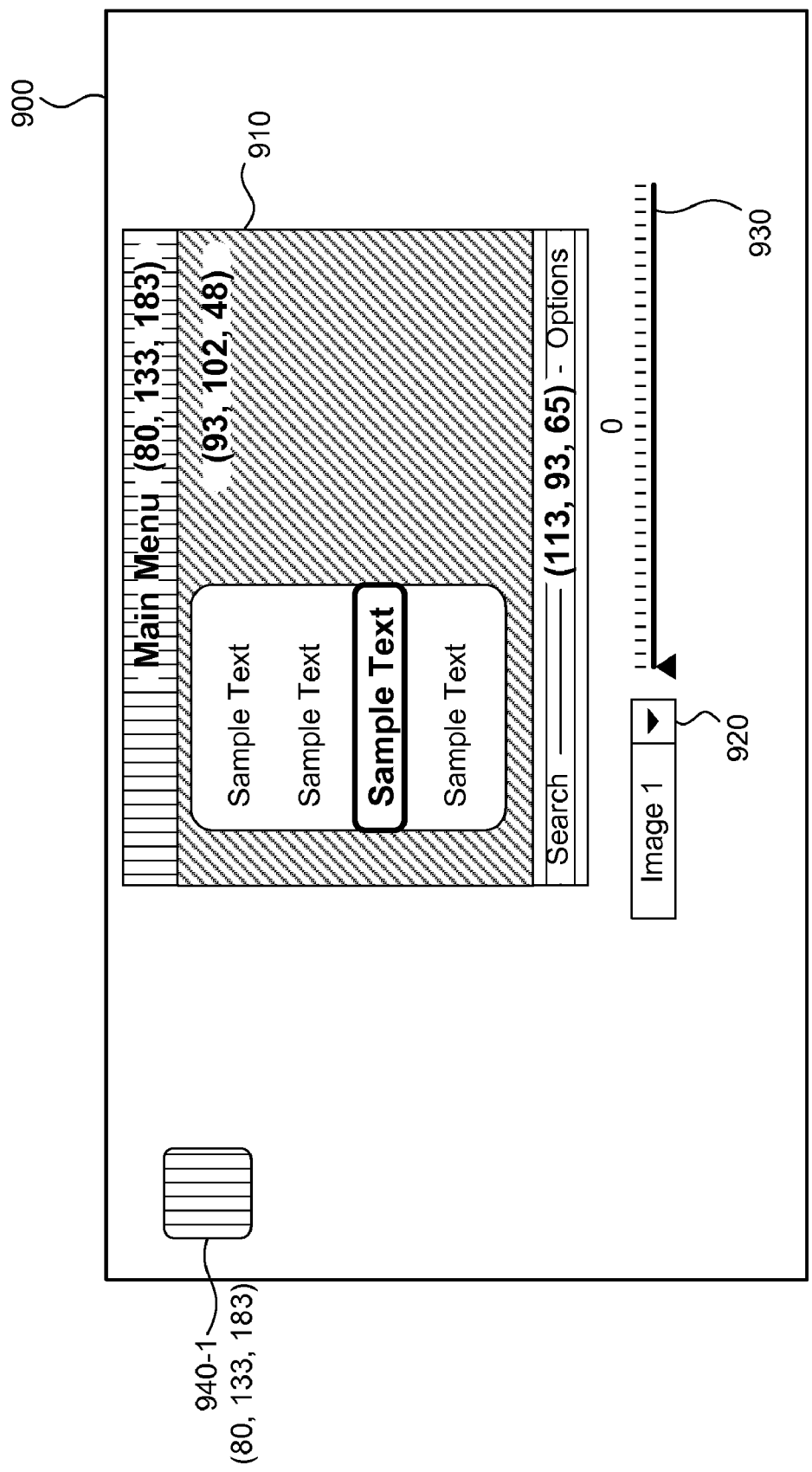

In response to a user selection of a color included in image area 910, a color swatch 940-1 representative of the selected color may be displayed as shown in FIG. 9B. In the illustrated example, a color represented by a vertical-line pattern in image area 910 has been selected and a representation of the color displayed in color swatch 940-1. In certain embodiments, in addition or alternative to displaying a visual representation of the selected color in color swatch 940-1, a numerical representation (e.g., an RGB triplet) of the selected color may be displayed. FIG. 9B shows RGB triplet (80, 133, 183) as being associated with color swatch 940-1.

A user may select additional colors from image area 910. For each selected color, a color swatch representative of the selected color may be displayed in GUI 900 as space may allow. FIG. 9C illustrates multiple color swatches (e.g., color swatches 940-1 through 940-3, collectively referred to as "color swatches 940") displayed in GUI 900 and respectively associated with colors selected from image area 910 by a user. In FIG. 9C, a vertical-line pattern, diagonal-line pattern, and horizontal-line pattern respectively represent colors selected from image area 910. In addition to visually representing the selected colors in color swatches 940, an RGB triplet is displayed in association with each of the color swatches 940. In the illustrated example, RGB triplet (80, 133, 183) is associated with color swatch 940-1, RGB triplet (93, 102, 48) is associated with color swatch 940-2, and RGB triplet (113, 93, 65) is associated with color swatch 940-3. Color swatches 940 representative of colors selected by a user from image area 910 may be referred to as "source color swatches" and may be used as a baseline for generating a new color scheme.

As mentioned, color scheme customization facility 160 may be configured to provide at least one tool configured to facilitate a user selection of a change to be applied to an initial color scheme. In particular, a user may select a change to be applied to one or more colors selected from image area 910. For example, after one or more colors have been selected from image area 910 as shown in FIG. 9C, the user may utilize graphical slider tool 930 to select a change to be applied to the colors.

In certain embodiments, graphical slider tool 930 may represent a scale of angular offsets that may be applied to shift a color within HSV color space model 700. In FIGS. 9A-9D, graphical slider tool 930 shows a scale of angular offsets ranging from a zero-degree angular offset to a three-hundred-sixty-degree angular offset. The scale may be divided in increments such as the ten-degree increments shown in FIGS. 9A-9D.

Graphical slider tool 930 may include at least one tool configured to facilitate a user selecting an angular offset from the scale of angular offsets. As shown in FIG. 9C, graphical slider tool 930 may include an arrow, which may be moved by a user to various positions along the scale of angular offsets to select a particular angular offset. In FIG. 9C, arrow 950 is positioned at a far-left position associated with a zero-degree angular offset (i.e., no change). Graphical slider tool 930 may also include a numerical representation 960 of the position of arrow 930. In FIG. 9C, the numerical representation 960 indicates a zero-degree offset.

Figure 9D:
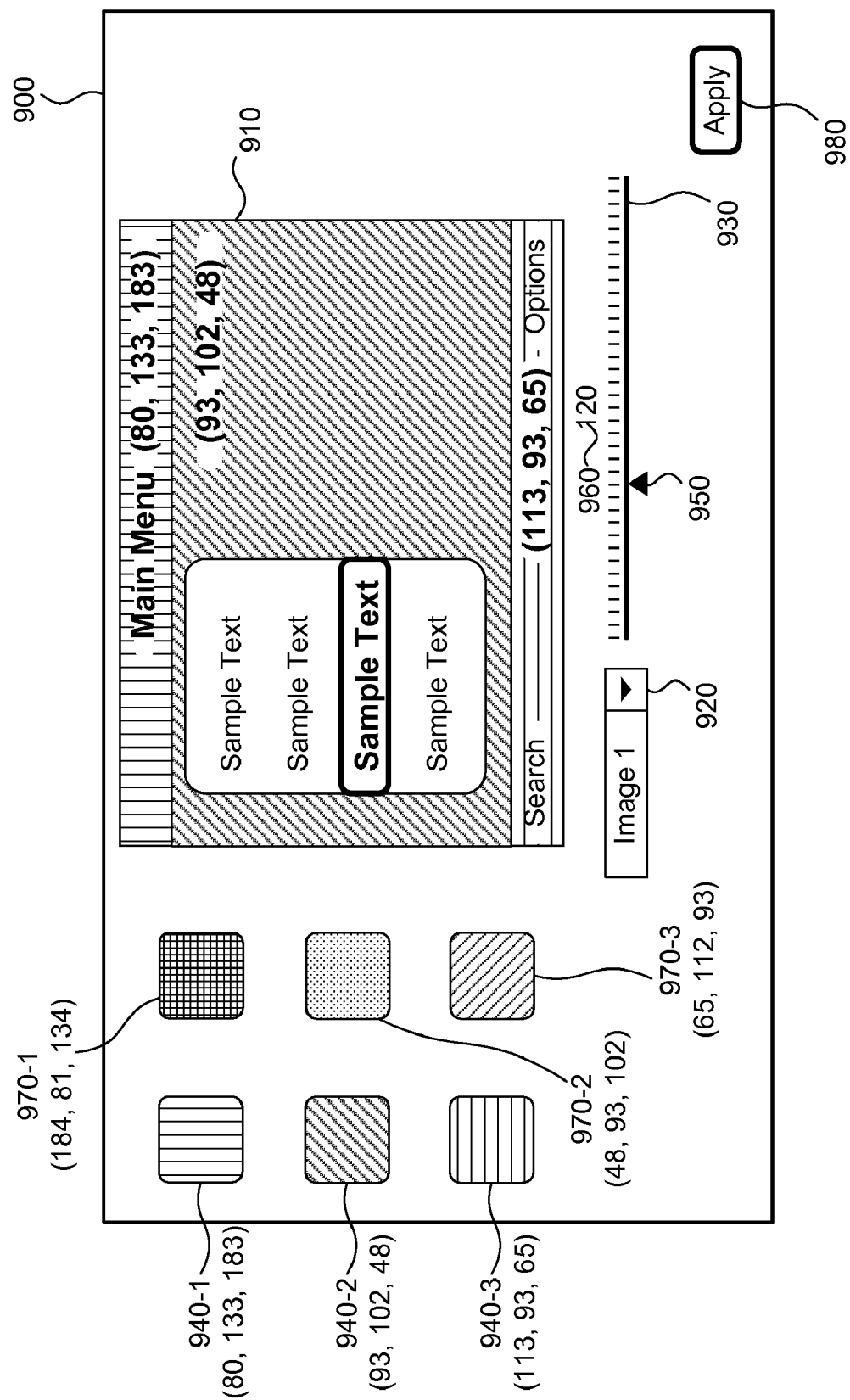

The user may cause arrow 950 to be moved to another position along the graphical slider tool 930, such as by using a cursor or mouse pointer to select or to drag arrow 950 to a target position. FIG. 9D illustrates arrow 950 after it has been moved to another position on the scale of angular offsets. In the example shown in FIG. 9D, arrow 950 is positioned at a one-hundred-twenty degree angular offset, which is also indicated by the numerical representation 960 of the angular offset.

In response to a user selection of an angular offset to be applied to one or more colors selected from image area 910, color scheme customization facility 160 may recognize and apply the offset to the selected colors to determine corresponding new colors. This may be accomplished by applying the offset as described above.

One or more preview color swatches respectively corresponding to the new colors, which have been determined from a color shift as described above, may be displayed in GUI 900. FIG. 9D shows preview color swatches preview color swatches 970-1 through 970-3 (collectively referred to as "preview color swatches 970") respectively associated with color swatches 940-1 through 940-3. In FIG. 9D, colors resulting from application of the selected offset to the colors represented in source color swatches 940-1 through 940-3 are respectively represented by a checkered, speckled, and diagonal-line pattern in preview color swatches 970-1 through 970-3. In addition to visual representing previews of the resultant colors in preview color swatches 970, an RGB triplet is displayed in association with each of the preview color swatches 970. In the illustrated example, RGB triplet (184, 81, 134) is associated with color swatch 970-1, RGB triplet (48, 93, 102) is associated with color swatch 970-2, and RGB triplet (65, 112, 93) is associated with color swatch 970-3). In this or similar manner, a user may be provided with a preview of colors that would be generated by applying a uniform color shift (e.g., an angular offset) to an initial color scheme or to one or more colors included in the initial color scheme.

The graphical slider tool 930 shown in FIGS. 9A-9D is illustrative only. One or more other user interface tools may be provided and may be configured to facilitate user selection of a change to be applied to an initial color scheme and/or to one or more colors selected from the initial color scheme. In certain other embodiments, for example, GUI 900 may include a graphical color palette configured to facilitate a user selection of a change to be applied. For example, the user may select a new color to which an initial color should be changed.

A selected color shift (e.g., selected angular offset) may be applied to each of the colors in an initial color scheme to generate another color scheme. FIG. 9D illustrates an "Apply" button 980, which may be selected by a user. In response, color scheme customization facility 160 may apply the selected color shift to each of the colors or color points in the initial color scheme as described above to generate a new color scheme. Thus, a user may utilize one or more tools in GUI 900 to select a color from an initial color scheme and an offset to be applied to the color to identify another color. Color scheme customization facility 160 may extrapolate a new color scheme by applying the offset to all of the colors or color points in the initial color scheme.

Color scheme customization facility 160 may be configured to associate the new color scheme with a GUI. In certain examples, this may be performed automatically, such as when a user has previously selected a GUI to which a new color scheme should be applied. In certain other examples, color scheme customization facility 160 may associated the new color scheme with a GUI in response to additional user input. After the new color scheme has been associated with a GUI, e.g., by associating data representative of the color scheme with a color layer 420 in the GUI, the color scheme will be included when user interface facility 150 generates and display the GUI.

Figure 10:
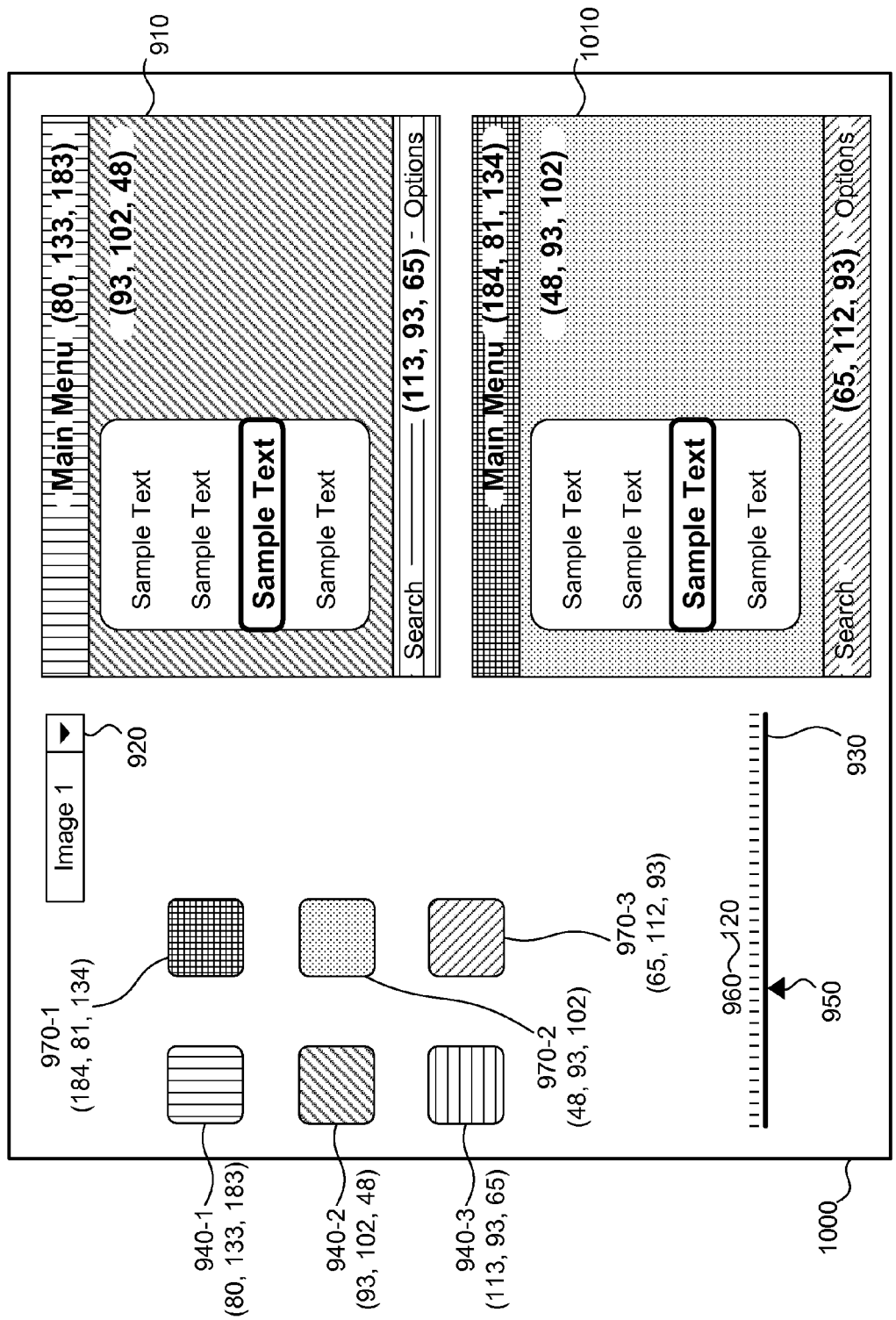
FIG. 10 illustrates an exemplary GUI having a preview area included therein.

In certain embodiments, color scheme customization facility 160 may be configured to generate and provide a preview of a GUI as it would appear with a new color scheme included therein. In some examples, the GUI preview may be provided in real time, or at least substantially real time, as a color shift is selected. FIG. 10 illustrates an exemplary GUI 1000 including a preview area 1010 configured to display a preview of a GUI with a new color scheme included therein. In particular, FIG. 10 illustrates an example of an initial color scheme included in GUI 800 of FIG. 8A being shifted by an offset to generate a new color scheme and pre-association of the new color scheme with GUI 800 to generate a preview image of GUI 850 in preview area 1010.

As shown in FIG. 10, GUI 1000 may include one or more of the tools included in GUI 900 and configured to facilitate user selection of a color shift to be applied to an initial color scheme to generate a new color scheme. In addition, preview area 1010 may provide a preview of a GUI as it would appear with the new color scheme included therein. In certain embodiments, the preview area 1010 may be configured to display a GUI preview in real time corresponding to when a user selects an angular offset with graphical slider tool 930.

Figure 11:
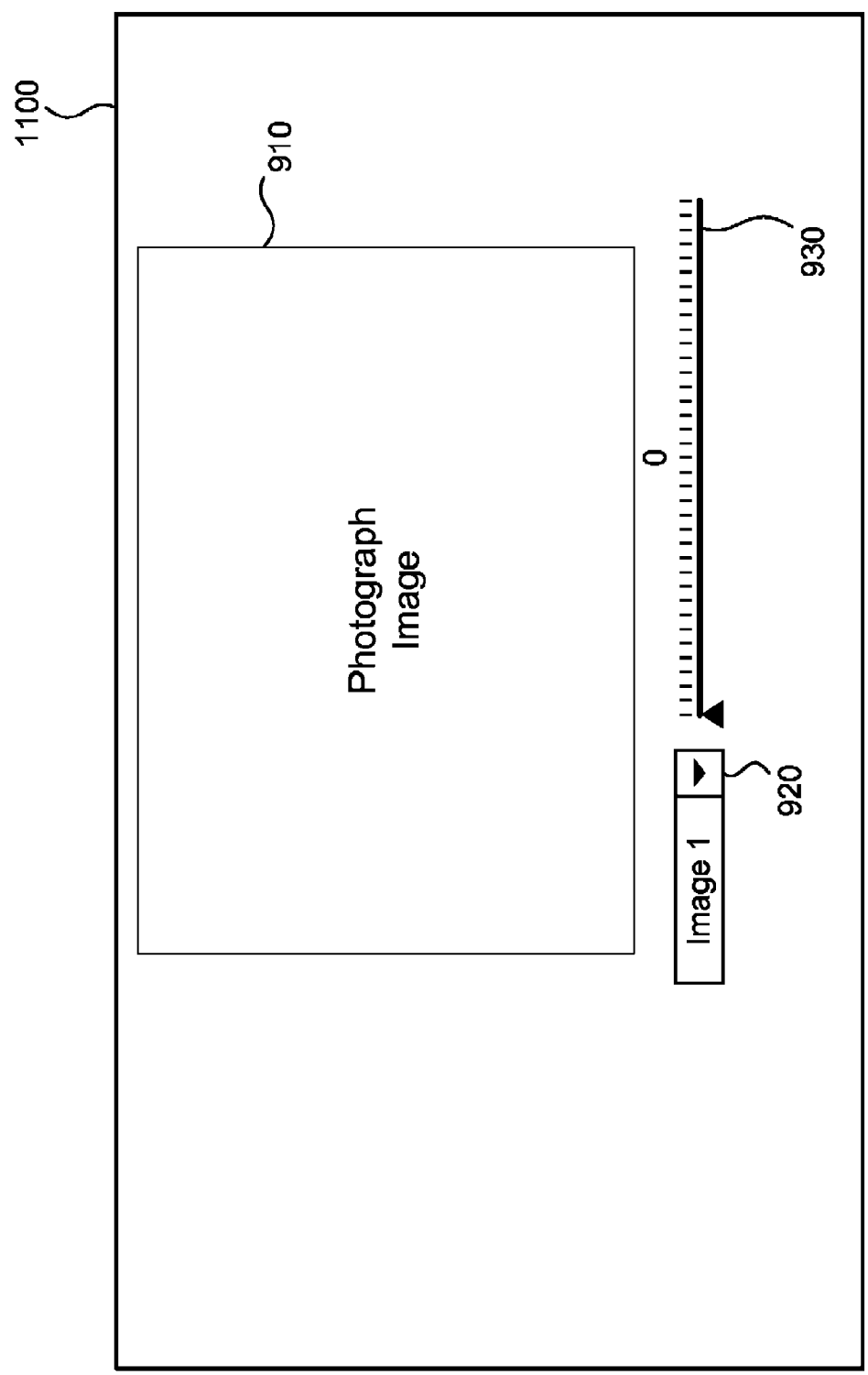
FIG. 11 illustrates an exemplary GUI having a photograph image in an image area.

In any of the ways described above, a color scheme in a GUI or other image may be used as a baseline and one or more parameters of the color scheme shifted to generate another color scheme, which may then be applied to a GUI. In certain embodiments, color scheme customization facility 160 may be configured to facilitate utilization of a color scheme extracted from an image, such as a photograph image, as a baseline for generating another color scheme. FIG. 11 illustrates a GUI 1100 including one or more of the tools included in GUI 900. As shown, GUI 1100 may include a photograph image in image area 910. The photograph image may be selected for display in image area 910 in any suitable way, including by a user utilizing drop-down menu 920 to select the photograph from a library of images.

Color scheme customization facility 160 may be configured to extract data representative of one or more colors from of the photograph image. The colors may be identified and extracted in any suitable way. In certain embodiments, for example, color scheme customization facility 160 may be configured to extract colors from the photograph image based on frequency and contrast of the colors in the photograph image. Any suitable number of colors may be extracted, such as a number of colors corresponding to a number of color variables associated with a GUI. For example, the six most dominant and/or frequent colors in a photograph image may be identified and extracted for use in coloring a GUI having six color variables. The number of colors to be extracted may be defined manually or automatically. Data representative of the extracted colors and corresponding parameters (e.g., parameters defining contrast relationships between the colors) may define a color scheme, which may be used to color a GUI and/or as an initial, baseline color scheme to generate another color scheme that may be used to recolor a GUI, as described above.

Use of a photograph image to generate a baseline color scheme may allow a user to utilize a favorite photograph or preferred color combination found in a photograph or other image to color one or more GUIs and/or as a starting point for customizing and/or recoloring one or more GUIs. For example, a user may want to customize a GUI based on colors of autumn. The user may utilize a photograph of autumn colors to do this, as described above.

Figure 12:
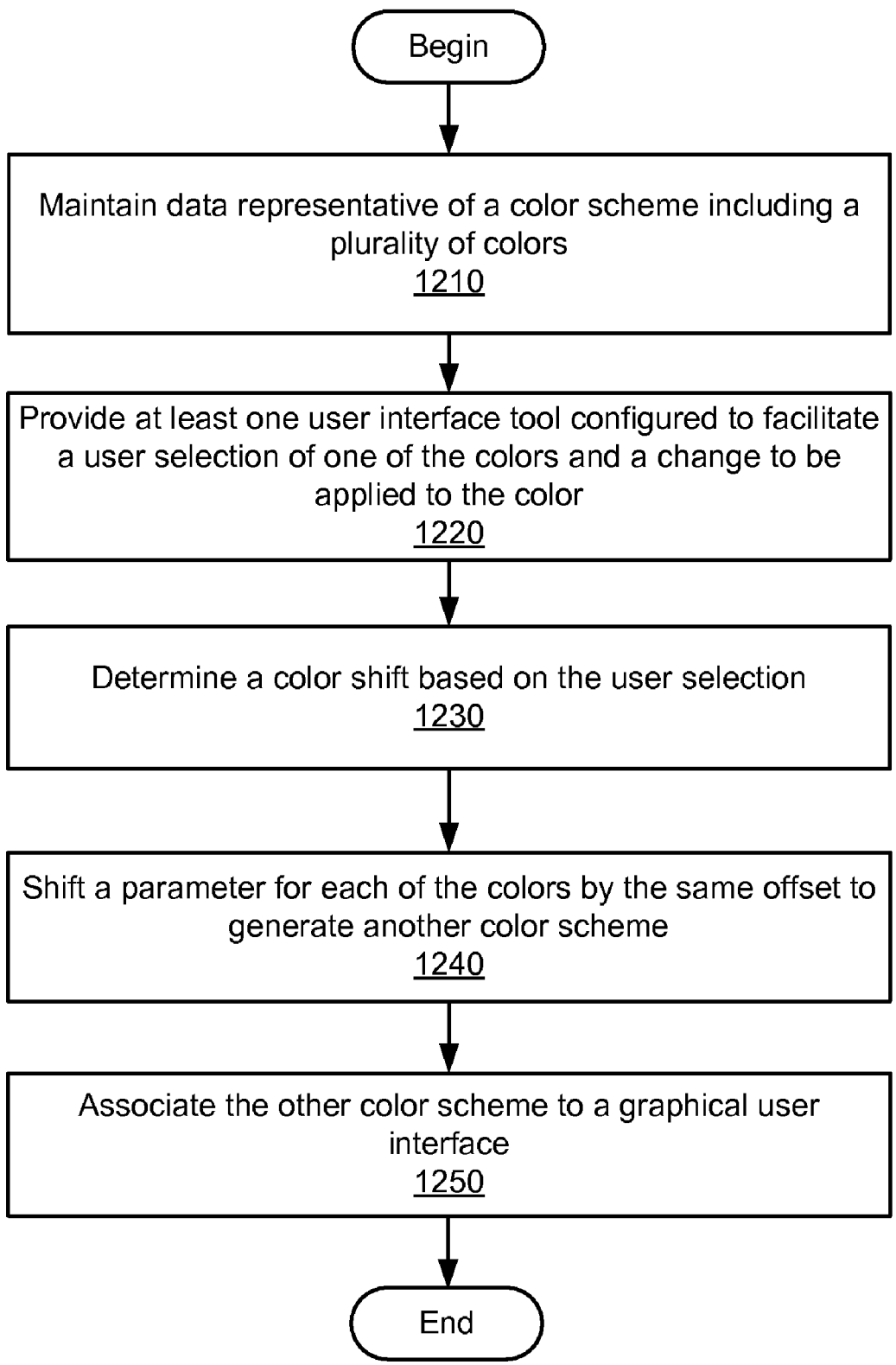
FIG. 12 illustrates an exemplary user interface color scheme customization method.

FIG. 12 illustrates an exemplary user interface color scheme customization method. While FIG. 12 illustrates exemplary steps according to one embodiment, other embodiments may omit, add to, reorder, and/or modify any of the steps shown in FIG. 12.

In step 1210, data representative of a color scheme including a plurality of colors is maintained. Step 1210 may be performed in any of the ways described above, including storing the data in storage facility 130.

In step 1220, at least one user interface tool is provided. The user interface tool(s) may be configured to facilitate a user selection of one of the colors in the color scheme and a change to be applied to the color. Step 1220 may be performed in any of the ways described above, including providing one or more of the tools illustrated in GUI 900, GUI 1000, and/or GUI 1100.

In step 1230, a color shift is determined based on the user selection. Step 1230 may be performed in any of the ways described above, including recognizing an offset from the user selection.

In step 1240, each of the colors in the color scheme is shifted by the same offset to generate another color scheme. That is, the color shift determined in step 1230 is applied to each of the colors in the color scheme to generate the other color scheme. Step 1240 may be performed in any of the ways described above, including shifting a hue parameter for each of the colors by a same angular offset in a cylindrical color shape model, as described above.

In step 1250, the other color scheme is associated with a graphical user interface. Step 1250 may be performed in any of the ways described above, including associating a color layer 420 of the graphical user interface with data representative of the other color scheme.

In addition to or as part of any of the steps shown in FIG. 12, a color scheme may be mapped to and/or from a cylindrical color space model such as HSV color space model 700.

While certain embodiments described above include shifting a color scheme in response to user input, this is illustrative only and not limiting in any sense. A color scheme may be shifted as described above in response to any suitable predefined trigger event. Examples of color shift trigger events may include, but are not limited to, communications having certain attributes, user attributes, voice attributes of a user (e.g., a certain tone and/or volume threshold used by a user in a voice communication), environmental temperature attributes (e.g., a fluctuation in a body temperature of a user who is in physical contact with device 200 or access device 320), and other environmental factors.

As an example, a certain communication event having one or more specific attributes (e.g., a communication from a particular person or source) may be defined as a trigger event for shifting a color scheme associated with a GUI. Reception of such a communication may be detected and may trigger a particular color shift in a color scheme of a GUI. For instance, when a text message or other communication is received from a certain predetermined person or source, a color scheme associated with a GUI may be shifted to generate another color scheme that may be used to recolor the GUI.

The occurrence of a trigger event may be identified in any suitable way and using any suitable technologies. For example, the occurrence of a predefined communication event may be identified from communications data. As another example, device 200 or access device 320 may include one or more sensors configured to detect predefined environmental factors such as user body temperature and/or user voice attributes.

A color shift preformed in response to a predefined trigger event may include a shift by a predetermined amount (e.g., a predetermined offset angle) or a shift to a particular color or color scheme. For example, a trigger event may be pre-associated with a particular color shift such as a shift to a particular color or color scheme. For instance, a trigger event that includes reception of a communication from a particular person may be pre-associated with a shift from a dominant color in an initial color scheme to a particular color (e.g., a pink color, which may be indicative of the person or source). A quantifiable amount by which the dominant color is shifted may be determined and used to shift each of the other colors in the initial color scheme by an identical offset to generate another color scheme, as described above. The new color scheme may then be associated with a GUI. In this or similar manner, a GUI color scheme may be automatically shifted to another color scheme used to recolor the GUI in response to an occurrence of a predefined trigger event.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
maintaining, by at least one computing device, data representative of a color scheme including a plurality of colors;
shifting, by at least one computing device, a parameter for each of said colors by a same offset to generate another color scheme; and
associating, by at least one computing device, said another color scheme with a graphical user interface;
wherein said parameter comprises a hue parameter and said same offset includes an angular offset, said shifting including shifting said hue parameter for each of said colors by said angular offset in a cylindrical color space model to generate said another color scheme.

2. The method of claim 1, wherein said cylindrical color space model includes a hue, saturation, value ("HSV") color space model, and wherein said shifting preserves a saturation parameter and a value parameter for each of said colors in said color scheme.

3. A method comprising:
maintaining, by at least one computing device, data representative of a color scheme including a plurality of colors;
shifting, by at least one computing device, a parameter for each of said colors by a same offset to generate another color scheme;
associating, by at least one computing device, said another color scheme with a graphical user interface; and
extracting, by at least one computing device, said color scheme from data representative of a photograph image based on color frequency and contrast.

4. A method comprising:
maintaining, by at least one computing device, data representative of a color scheme including a plurality of colors;
shifting, by at least one computing device, a parameter for each of said colors by a same offset to generate another color scheme;
associating, by at least one computing device, said another color scheme with a graphical user interface; and
mapping, by at least one computing device, said color scheme to a cylindrical color space model, said shifting being performed in said cylindrical color space model.

5. The method of claim 4, wherein said cylindrical color space model includes a hue, saturation, value ("HSV") color space model, and wherein said shifting preserves a saturation parameter and a value parameter for each of said colors in said color scheme.

6. The method of claim 4, wherein said parameter comprises a hue parameter and said same offset includes an angular offset, said shifting including shifting said hue parameter for each of said colors by said angular offset in said cylindrical color space model to generate said another color scheme.

7. The method of claim 4, further comprising displaying, by at least one computing device, said graphical user interface, said graphical user interface including two grayscale layers and a color layer sandwiched between said grayscale layers, wherein said color layer is associated with data representative of said another color scheme.

8. The method of claim 7, wherein:
at least one of said grayscale layers comprises at least one grayscale asset having at least one grayscale parameter; and
said shifting preserves said at least one grayscale parameter in the graphical user interface.

9. A method comprising:
maintaining, by at least one computing device, data representative of a color scheme including a plurality of colors;
shifting, by at least one computing device, a parameter for each of said colors by a same offset to generate another color scheme;
associating, by at least one computing device, said another color scheme with a graphical user interface; and
displaying, by at least one computing device, said graphical user interface, said graphical user interface including two grayscale layers and a color layer sandwiched between said grayscale layers, wherein said color layer is associated with data representative of said another color scheme.

10. The method of claim 9, wherein said shifting preserves at least one of a hue relationship and a contrast relationship between said colors in said color scheme.

11. The method of claim 9, wherein said color scheme is initially associated with said graphical user interface, and wherein said associating includes substituting said another color scheme for said color scheme.

12. The method of claim 9, wherein at least one of said grayscale layers comprises at least one grayscale asset having at least one grayscale parameter.

13. The method of claim 12, wherein said shifting preserves said at least one grayscale parameter in the graphical user interface.

14. The method of claim 9, further comprising:
providing, by at least one computing device, at least one user interface tool configured to facilitate a user selection of one of said plurality of colors included in said color scheme and a change to be applied to said one of said colors; and determining, by at least one computing device, said same offset based on said user selection.

15. The method of claim 14, further comprising extrapolating, by at least one computing device, said another color scheme from said user selection.

16. The method of claim 14, wherein said at least one user interface tool comprises at least one of an image area, a graphical slider tool, a source color swatch, and a preview color swatch.

17. The method of claim 9, tangibly embodied as computer-executable instructions on at least one non-transitory computer-readable medium.

18. A method comprising:
providing, by at least one computing device, at least one user interface tool configured to facilitate a user selection of one of a plurality of colors included in a color scheme and a change to be applied to said one of said colors;
determining, by at least one computing device, a color shift based on said user selection;
applying, by at least one computing device, said color shift to each of said colors in said color scheme to generate another color scheme; and
displaying, by at least one computing device, a graphical user interface;
wherein said graphical user interface includes two grayscale layers and a color layer sandwiched between said grayscale layers in said graphical user interface, and wherein said color layer is associated with data representative of said another color scheme.

19. The method of claim 18, wherein said applying said color shift includes shifting each of said colors by a same offset.

20. The method of claim 18, wherein said applying said color shift includes shifting a hue parameter for each of said colors by a same angular offset in a hue, saturation, and value ("HSV") color space model.

21. The method of claim 20, wherein said applying said color shift includes preserving a saturation parameter and a value parameter for each of said colors in said HSV color space model.

22. The method of claim 18, wherein said at least one user interface tool comprises a graphical slider tool representative of a scale of angular offsets from which said same angular offset is selected.

23. The method of claim 18, wherein said at least one user interface tool comprises an image area displaying said color scheme and configured to facilitate said user selection of said one of said colors.

24. A system comprising:
a user interface facility configured to provide a graphical user interface for display;
a storage facility configured to store data representative of a color scheme associated with said graphical user interface, said color scheme including a plurality of colors; and
a color scheme customization facility configured to
shift a parameter for each of said colors by a same offset to generate another color scheme, and
associate said another color scheme with said graphical user interface;
wherein said graphical user interface comprises a first grayscale layer, a second grayscale layer, and a color layer sandwiched between said first grayscale layer and said second grayscale layer, wherein one of said color scheme and said another color scheme is associated with said color layer.

25. The system of claim 24, wherein said color scheme customization facility is configured to
provide at least one user interface tool configured to facilitate a user selection of one of said plurality of colors included in said color scheme and a change to be applied to said one of said colors, and
determine said same offset based on said user selection.

* * * * *